United States Patent [19]

Peavy

[11] Patent Number: 5,310,870
[45] Date of Patent: May 10, 1994

[54] FLUOROALKENE/HYDROFLUOROCARBON TELOMERS AND THEIR SYNTHESIS

[75] Inventor: Richard E. Peavy, Hockessin, Del.

[73] Assignee: E. I. Du Pont de Nemours and Company, Wilmington, Del.

[21] Appl. No.: 929,003

[22] Filed: Aug. 13, 1992

[51] Int. Cl.$^5$ .................... C08F 14/26; C08F 14/18
[52] U.S. Cl. .................... 528/392; 528/397; 528/401; 526/206; 526/247; 526/253; 526/255
[58] Field of Search ............ 528/392, 397, 401; 526/253, 206, 247, 255

[56] References Cited

U.S. PATENT DOCUMENTS

| | | | |
|---|---|---|---|
| 2,562,547 | 7/1951 | Hansford et al. | 570/139 |
| 2,856,439 | 10/1958 | Frey | 526/206 |
| 3,067,262 | 12/1962 | Brady | 526/206 |
| 3,105,824 | 10/1963 | Green et al. | 526/206 |
| 3,616,371 | 10/1971 | Ukihashi et al. | 204/159.22 |
| 3,956,000 | 5/1976 | Kuhls et al. | 526/17 |
| 4,016,345 | 4/1977 | Holmes | 526/206 |
| 4,166,165 | 8/1979 | Hisasue et al. | 526/206 |
| 4,393,119 | 7/1983 | Concannon | 428/413 |
| 4,487,902 | 12/1984 | Fritschel | 526/253 |
| 4,521,575 | 6/1985 | Nakagawa | 526/253 |
| 4,530,981 | 7/1985 | Malhotra | 526/253 |
| 4,636,549 | 1/1987 | Gangal | 526/253 |
| 4,677,175 | 6/1987 | Ihara | 526/253 |
| 4,717,744 | 1/1988 | Boutevin et al. | 526/206 |
| 4,792,594 | 12/1988 | Gangal | 526/253 |
| 4,933,388 | 6/1990 | Blickle et al. | 524/462 |
| 5,075,397 | 12/1991 | Tonelli et al. | 526/206 |
| 5,124,420 | 6/1992 | Tonelli et al. | 526/306 |
| 5,182,342 | 1/1993 | Feiring et al. | 526/206 |

*Primary Examiner*—John Kight, III
*Assistant Examiner*—P. Hampton-Hightower
*Attorney, Agent, or Firm*—Charles E. Feeny

[57] ABSTRACT

The invention relates to fluorotelomers, their synthesis by free radical-initiated telomerization of fluoroalkenes (e.g. TFE) in which hydrofluorocarbons (HFC's) are used both as telogens and as solvents, and dispersions of the fluorotelomers in HFC's. The fluorotelomers are normally solid, essentially non-distillable and highly crystalline, and their dispersions exhibit excellent lubricant properties and stability under normal usage and have a negligible impact on the environment compared to conventional telomer dispersions.

12 Claims, No Drawings

FLUOROALKENE/HYDROFLUOROCARBON TELOMERS AND THEIR SYNTHESIS

FIELD OF THE INVENTION

This invention is directed to a class of wax-like fluorotelomer solids having broad utility as insoluble, chemically and thermally stable lubricants, release agents, and thickening agents and methods of preparing them.

BACKGROUND OF THE INVENTION

Wax-like fluorotelomer solids are described by Brady in U.S. Pat. No. 3,067,262. Such wax-like solids heretofore have been based predominantly on a fluorotelomer backbone of polytetrafluoroethylene (PTFE) formed by telomerization of tetrafluoroethylene (TFE) in trichlorotrifluoroethane (TCTFE) in the presence of a peroxide free-radical initiator, with or without a so-called "active telogen" (chain transfer agent) to limit the molecular weight of the waxy telomer products, wherein TCTFE served both as a solvent and as a telogen. Telomerization can be defined as a reaction between two substances in which one substance provides the terminal groups (telogen) and the other provides the internal linkages of the telomer. An example is a free radical initiated reaction wherein an ethylenically unsaturated monomer, "A", reacts with a telogen, "YZ", to yield telomer:

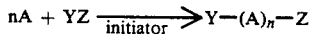

$$nA + YZ \xrightarrow{\text{initiator}} Y-(A)_n-Z$$

In a preferred prior art system, the monomer, "A", is tetrafluoroethylene (TFE), and the telogen, "YZ", is 1,1,2-trichloro-1,2,2-trifluoroethane (TCTFE). The resulting fluorotelomers are dispersed in TCTFE and, as such, provide waxy solid polymer dispersions that exhibit excellent dry lubricating properties which are used commercially.

However, chlorofluorocarbons, such as TCTFE, can be degraded in the presence of UV light to give chlorine free radicals which can react with ozone. Therefore, they are believed by some to be a major factor in the depletion of the protective ozone layer in the upper atmosphere. In addition, chlorofluorocarbons, such as TCTFE, may cause global warming. As a result of the widely perceived threat of certain CFC's to the ozone layer in the upper atmosphere and of their involvement in global warming, the manufacture and use of some CFC's, including TCTFE, will be banned in the future. Consequently, a replacement telogen/solvent must be found if production and use of versatile fluorotelomer dispersions are to continue. However, the chlorine content of CFC's would be expected to make them more active chain transfer agents (telogens) than chlorine-free fluorocarbons. It does not follow, therefore, that just any fluorine-containing organic carbon compounds can be substituted for CFC's as combined telogens/solvents. The challenge becomes that of finding substitute combined solvents/telogens that will allow the continued manufacture of fluorotelomer and their dispersions with no significant deviation in properties or performance in handling, manufacture, testing, and perceived quality.

SUMMARY OF THE INVENTION

This invention relates to novel fluorotelomers, their synthesis by free radical initiated telomerization in which organic compounds containing hydrogen, fluorine, and carbon (hydrofluorocarbons or HFC's) are used both as telogens and as solvents, and dispersions prepared from such telomers. The telomers thereby obtained are normally solid, essentially non-distillable highly crystalline fluorotelomers of a fluoroalkene, e.g., of TFE, and hydrofluorocarbon telogens. The fluorotelomers of this invention and their dispersions exhibit excellent lubricant properties and stability under normal usage and have a negligible impact on the environment compared to conventional telomer dispersions.

DETAILED DESCRIPTION OF THE INVENTION

This invention provides wax-like normally solid, fluorotelomers using HFC's both as solvents and telogens, optionally with an "active telogen" to control molecular weight. Dispersions of the resulting new fluorotelomer in the HFC solvent/telogen match the properties and performance of conventional dispersions, including those currently made based on TCTFE solvent/telogen, thereby achieving the least disruption of existing applications. The HFC solvent/telogen has substantially less negative environmental impact than the TCTFE solvent/telogen presently used in the manufacture of these important wax-like solids. This invention relates also to a method of preparing a fluorocarbon telomer, wherein the fluoroalkene monomer is telomerized in an HFC which functions both as a reaction medium and a telogen. In addition, this invention relates to dispersions of the telomers of this invention in the HFC's in which they were prepared.

In a particular embodiment, this invention relates to novel fluorotelomers, and to a method for producing the same, which comprises reacting a fluoroalkene monomer of from 2-3 carbon atoms and 2-6 fluorine atoms, or a mixture thereof with a copolymerizable monomer, with a HFC telogen in solution in said HFC in the presence of a free radical initiator at a temperature in excess of 110° C. and up to 200° C., wherein said HFC:

consists essentially of an organic compound having a boiling point at atmospheric pressure between 25° C. and 150° C. and containing 2 to 8 carbon atoms, fluorine, at least one hydrogen, with or without one or more ether oxygen atoms, in which there are at least as many fluorine atoms as there are hydrogen atoms;

provided that said organic compound contains neither any
(1) alkyl group which is bonded to a perfluorinated group (e.g. $CH_3-CF_3$, $CH_3-CF_2-$, etc.), nor
(2) adjacent $-CH_2-$ groups, except when said $-CH_2-$ groups are part of a cyclic compound, and recovering a fluorotelomer having a number molecular weight between 1800 and 75,000. On the other hand, there are at least two classes of telomers which are in common use commercially. One of them has a number average molecular weight in the 3,000 to 6,000 range, preferably 4000 to 5000; the other has a number average molecular weight in the range between 15,000 and 75,000, preferably 25,000 to 35,000. The shorter chain lengths in the first class of telomers result from the use of the telogen/solvents of this invention plus so-called "active telogens" (or "chain transfer agents") which on reaction with TFE produce predominantly molecules which contain about 30 to 60 TFE units per active telogen unit. Methylcyclohexane is an example of such an "active telogen" which yields a majority of H-terminated "Y" ends and $C_7H_{13}$-terminated "Z" ends, with only a minor amount of ends from the telogen/solvents of this invention.

In a preferred embodiment, said fluorotelomer has a crystalline melting point in the range of 275° to 327° C., as determined by differential scanning calorimetry. In another preferred embodiment, this invention relates to a dispersion of fluorotelomer comprising the above-described telomer in the above-described HFC telogen/solvent.

TFE and hexafluoropropylene are the preferred fluroalkene monomers. Homotelomers are preferred but fluoroalkene copolymers are also included in all monomer ratios, the amount of comonomer typically being 0.3 to 3 wt. % of the copolymer. Ethylenically unsaturated compounds can be used as comonomers in producing the fluorotelomer dispersions of the present invention, the amount of comonomer typically being 0.3 to 3 wt. % of the copolymer. Preferred comonomers are selected from highly fluorinated (e.g., perfluorinated) ethylenically unsaturated monomers, other than TFE. The most preferred for TFE is perfluoropropylene.

The hydrofluorocarbons used to produce the fluorotelomers of this invention may contain 4 to 12 fluorine atoms, preferably have 6 to 12 fluorine atoms and at least 1 hydrogen atom per molecule. The most preferred hydrofluorocarbons have from 4 to 6 carbon atoms so that the boiling point of the solvent/telogen is maintained within or near the range of about 25° to 100° C. to allow for economical usage and recovery. Preferred dispersions of these fluorotelomers in hydrofluorocarbon solvent provide coatings with a static coefficient of friction equal to or less than 0.35 and most preferably less than coatings obtained from TCTFE-based dispersions. The preferred dispersions of this invention are those of TABLE 1; they either match or exceed the performance of TCTFE-based dispersions in other applications as well. The most preferred dispersions are those of EXAMPLES 1 and 2.

The most likely end groups from preferred hydrofluorocarbon telogens are given below in TABLE 1. The structures and boiling points of these telogens are also shown in TABLE 1.

TABLE 1

STRUCTURES OF TELOGENS/SOLVENTS AND TELOMER END GROUPS

| | | TELOMER END GROUPS | |
|---|---|---|---|
| | TELOGEN/SOLVENT | "Y" | "Z" |
| EXAMPLE 1 | $CF_3CHFCHFCF_2CF_3$ 2,3-dihydro-decafluoropentane Boiling point 50° C. | H H— | $-CF(CF_3)CHFCF_2CF_3$ and $-CF\begin{smallmatrix}CHFCF_3\\CF_2CF_3\end{smallmatrix}$ |
| EXAMPLE 2 | $H(CF_2)_4H$ 1,4-dihydro-octafluorobutane Boiling point 44° C. | H— | $-(CF_2)_4H$ |
| EXAMPLE 3 | $(CF_3)_2CHCFHCF_2CF_3$ 2-trifluoromethyl-2,3-dihydrononafluoropentane | H— H— | $-CF\begin{smallmatrix}CF_2CF_3\\CH(CF_3)_2\end{smallmatrix}$ or $-C(CF_3)_2\ CHFCF_2CF_3$ |
| EXAMPLE 4 | $CF_3CFHCF_2OCH_3$ 2-hydrohexafluoropropyl methyl ether Boiling point 62° C. | H— H— | $-CF\begin{smallmatrix}CF_3\\CF_2-OCH_3\end{smallmatrix}$ and $-CH_2OCF_2CF_2CFHCF_3$ |
| EXAMPLE 5 | $CF_3-CF-CH_2$ $\;\;\;\;\;\;\;\;\;\;\;\;\vert\;\;\;\;\;\vert$ $\;\;\;\;\;\;\;\;\;CF_2-CH_2$ 1-trifluoromethyl-1,2,2-trifluorocyclobutane (Hexafluoropropylene/ethylene adduct) Boiling point 50° C. | H— H— | $-CH-CF-CF_3$ $\;\;\;\vert\;\;\;\;\;\vert$ $\;CH_2-CF_2$ and $CH_2-CF-CF_3$ $\vert$ $-CH-CF_2$ |
| | $CF_2-CH_2$ $\vert\;\;\;\;\;\vert$ $CF_2-CH_2$ | H— | $-HC-CF_2$ $\;\;\;\;\vert\;\;\;\;\vert$ $\;CH_2-CF_2$ |

TABLE 1-continued

STRUCTURES OF TELOGENS/SOLVENTS AND TELOMER END GROUPS

| TELOGEN/SOLVENT | TELOMER END GROUPS | |
|---|---|---|
| | "Y" | "Z" |
| 1,1,2,2-tetrafluoro-cyclobutane (TFE/ethylene adduct) Boiling point 50° C. | | |

In the absence of "active telogen" (also referred to herein as a chain transfer agent), most of the "Y" and "Z" end groups will be as shown in TABLE 1. However, there will be a relatively small contribution to both "Y" and "Z" from the principal radicals derived from the decomposition of the free radical initiator used in the telomerization reaction as fully conventional. An "active telogon" will provide a majority of the end groups, typically, for example, from 70% to 80% to the exclusion of the hydrofluorocarbon solvent/telogens, in conventional dependence on the quantity used. The "active telogens" that can be used in forming the fluorotelomers of the present invention include all of those well known in the prior art, e.g., tertiary hydrocarbons, cyclic aliphatic hydrocarbons such as methylcyclohexane, aliphatic ethers with alpha hydrogen atoms, aliphatic alcohols containing an alpha hydrogen such as isopropanol and ethanol, bivalent aliphatic sulfur compounds, tertiary aliphatic amines such as triethylamine, aliphatic carbonyl compounds (aldehydes, ketones, diketones, acids, esters, etc.) containing an alpha hydrogen atom such as acetone and tetrahydrofuran, dialkyl phosphites, dialkylamides, etc. The most preferred species is methylcyclohexane; tetrahydrofuran is also preferred. Preferably, less than 4.0 mole % of active telogen are used based on the total number of moles of monomer so as to provide fluorotelomers which are not too short in length, e.g., 1.0–4.0 mole %, preferably 2.5 mole %, based on the number of moles of monomer.

Essentially any free radical initiator will initiate reaction to produce the fluorotelomers of this invention in the presence of hydrofluorocarbon solvent/telogen and fluoroalkene monomer. The free radical initiator preferably also initiates extraction of the "Y" end cap from the telogen. Preferred free radical initiators are ditertiary-butyl peroxide, tertiary-butyl perbenzoate, benzoyl peroxide, and azo initiators such as 1,1-azobis(cyanocyclohexane), most preferably di-tertiary butyl peroxide. The amount of free radical initiator used preferably falls within the range of 0.20 to 2.0 wt. %, most preferably 0.4 to 1 wt. %, based on the weight of monomers to be polymerized.

The process of the present invention provides a high degree of monomer conversion to telomer of above 50%, typically above 75% and often above 90%, depending on the fluorotelomer product. The telomerization reaction typically proceeds at temperatures in excess of 110° to about 200° at autogenous pressures. The pressure can range from 100 to 700 psig. The preferred reaction time is 1–6 hours. Preferably, the reaction temperature falls within the range of 110°–180° C. and the pressure is kept at a maximum in the range of 400–600 psig. Most preferably, the reaction temperature is in the range of 120°–160° C. at 600 psig in a continuous flow reactor where reaction proceeds for from 1–2 hours. A batch reactor is most preferably at an autogenous pressure with temperatures in the range of 125°–160° C., and the reaction proceeds for from 4–6 hours. The total amount of monomer in the telogen/solvent generally is preferably at a molar ratio of telogen:monomer of 2:1 to 8:1. High ratios provide telomers of lower molecular weight.

After reaction, the fluorotelomer is recovered as a dispersion in the hydrofluorocarbon solvent/telogen, as is conventional. The dispersion typically contains from 5–20 wt. % of the fluorotelomer, with dispersions of high molecular weight fluorotelomers, e.g., falling at the low end of the range. These dispersions will provide coatings having static coefficient of friction less than 0.35, as determined by the conventional inclined plane test wherein Kraft paper, coated with the dispersions and dried, is used for the plane and slide. The angle of inclination of the plane at which the slide moves on the plane, theta, defines the static coefficient of friction, which is quantified by the following formula:

tan theta = mu, wherein mu is the static coefficient of friction.

The telomers and dispersions, as described above, for example.

The following general procedure was used in preparing the fluorotelomers referred to in the examples that follow this discussion. While this procedure is a batch process, the present invention can be preformed by numerous other variants and a continuous process as well, utilizing conventional equipment, procedures, conditions and considerations.

A 400 ml Hasteloy shaker bomb is purged with nitrogen and charged with a dilute solution of the free radical initiator and optionally, an active telogen, in 125–200 ml total volume of a hydrofluorocarbon(s) telogen/solvent. The shaker bomb is then sealed, cooled to 10°–15° C, and evacuated. About 30 g of tetrafluoroethylene (TFE) is then added to the bomb. The shaker is started, and the bomb and its contents are heated to the reaction temperature and held at that temperature until pressure measurements indicate that essentially all of the TFE has been consumed. Heating is then stopped and the bomb is cooled again to 15° C. before discharging the contents into a tared vessel to determine the weight of recovered fluorotelomer dispersion and, after removal of unreacted solvent, the weight and percentage of the fluorotelomer made.

The number average molecular weights of the telomers of this invention were calculated from their crystalline melting points, using the formula derived by Flory in his textbook "Principles of Polymer Chemistry", published by the Cornell University Press (the same method was used for similar products in U.S. Pat. No. 3,067,262), as follows:

$$M_n = \frac{200}{685\left[\frac{1}{T_m} - \frac{1}{600}\right]}$$

wherein $M_n$ is the number average molecular weight and $T_m$ is the crystalline melting point in degrees Kelvin, the crystalline melting points having been determined from the loss of birefrigence, as observed through crossed polarizers of a hot-stage microscope, or by use of a Differential Scanning Calorimeter.

EXAMPLE 1

A solution of 0.28 g di-tert.-butyl peroxide in 150 ml. of 2,3-dihydrodecafluoropentane was loaded into a shaker pressure vessel or tube that had been previously purged with nitrogen. The shaker tube was sealed, pressurized with nitrogen to 100 psi, and then cooled to 15° C. The shaker tube was evacuated, 30 g. of tetrafluoroethylene added, and the vessel and contents were gradually heated to 150° C. and held at 150° C. for 6 hours under vigorous agitation. The shaker tube was then cooled to 15° C., opened, and the contents discharged into a tared jar. There was recovered 252 g. of a white dispersion of the fluorotelomer in the 2,3-dihydrodecafluoropentane, containing 30.7 g or 12.2% of solid telomer product with a melting point of 322.8° C. The isolated fluorotelomer was found to have a molecular weight of about 26,000. Elemental analysis run in duplicate gave the following results:

| % C | % H | % F |
| --- | --- | --- |
| 19.48 | 0.12 | 74.38 |
| 19.50 | 0.06 | 73.34 |

EXAMPLE 2

The procedure of EXAMPLE 1 was repeated with a free radical initiator solution comprising 0.23 g. of di-tert.-butyl peroxide in 140 ml. of 1,4-dihydrooctafluorobutane. A white dispersion of fluorotelomer (207 g) was obtained, containing 13% solids with a melting point of 326.6° C. The number average molecular weight of the fluorotelomer found to be approximately 50,000. Elemental analysis run in duplicate gave the following results:

| % C | % H | % F |
| --- | --- | --- |
| 22.11 | 0.36 | 69.17 |
| 22.19 | 0.37 | 70.31 |

EXAMPLE 3

The procedure of EXAMPLE 1 was repeated with a free radical initiator solution comprising 0.517 g. of tert.-butylperoxybenzoate in 180 ml. of 2-trifluoromethyl-2,3-dihydrononafluoropentane. The reaction with 40 g. of tetrafluoroethylene was carried out at 120° C. over 6 hours. A white polymer dispersion(318 g.) was recovered containing 44 g. or 14% solids. The melting point of the fluoro polymer was 327° C. Elemental analysis run in duplicate gave the following results:

| % C | % H | % F |
| --- | --- | --- |
| 22.07 | 0.00 | 72.85 |
| 23.00 | 0.02 | 72.31 |

EXAMPLE 4

The procedure of EXAMPLE 1 was repeated. The free radical initiator solution comprised 0.3 g. of di-t-butylperoxide in 150 ml of methyl 1,1,2,3,3,3-hexafluoropropyl ether. Reaction with 30 g. of TFE at 150° C. for 6 hours afforded 214 g. of a white dispersion with 14.1% solids. Melting point of the telomer was 324.9° C., with a number average molecular weight of about 30,000. Elemental analysis in duplicate of the telomer was:

| % C | % H | % F |
| --- | --- | --- |
| 22.73 | 0.32 | 74.15 |
| 22.85 | 0.23 | 73.21 |

EXAMPLE 5

The procedure of EXAMPLE 1 was repeated. The free radical initiator solution comprised 0.4 g. of t-butylperoxybenzoate in 150 ml of 1-trifluoromethyl-1,2,2-trifluorocyclobutane. Reaction with 30 g. of TFE at 125° C. for 6 hours afforded 225 g. of a white dispersion with 13.2% solids. Melting point of the telomer was 322.15° C., with a number average molecular weight of about 22,000. Elemental analysis of the telomer:

| % C | % H | % F |
| --- | --- | --- |
| 23.20 | 0.36 | 68.37 |
| 23.37 | 0.33 | 69.30 |

EXAMPLE 6

The procedure of EXAMPLE 1 was repeated. A solution of 0.33 g. of di-t-butyl peroxide (free radical initiator) and 0.71 g. of methylcyclohexane (active telogen or chain transfer agent) in 140 ml. of 2,3-dihydrodecafluoropentane was reacted with 30 g. of tetrafluoroethylene at 150° C. for 6 hours, yielding 221 g. of a white dispersion containing 12.97% solids. The isolated telomer had a melting point of 295.58° C. and a number average molecular weight of about 3200. The telomer had the end group functionality of EXAMPLE 1 plus H and $C_7H_{13}$ end groups derived from methylcyclehexane, with the groups derived from methylhexane constituting about 80% of the functionality in the telomer product.

EVALUATION OF EXPERIMENTAL FLUOROCARBON DISPERSIONS

New fluorocarbon telomers prepared using HFC's as telogen/solvent were evaluated for grease thickening efficiency, oil separation characteristics of the grease, and wear test performance of the grease. Results are shown as TABLE 1.

Grease samples were prepared using "KRYTOX" GPL-106 Fluorinated Oil (viscosity @ 40° C., 240 centistokes) as the base oil. Enough dispersion was used to give 15 mass-percent solids (based on solids content reported for the dispersion). After "drying" to remove the dispersion solvent, the slurry was milled three times at 0.0015 inch clearance on a 3-roll ink mill. Penetrations (consistency), oil separation by centrifuge and 4-ball wear performance were measured.

Thickening Efficiency

At least one additional grease sample was prepared from each candidate dispersion. The consistency as a function of solids content allowed calculation of solids required to prepare a grease of a given consistency (penetration=245).

"FREON"-113 was the telogen/solvent used in production of the Control "VYDAX" 1000 fluorocarbon dispersion.

Grease Performance

TABLE 2 shows the oil separation characteristics of several experimental grease samples. These data were obtained in a laboratory centrifuge operating for 20 hours at 200° F. Oil separation was least for the Control "VYDAX" 1000 fluorotelomer dispersion. There was some variation as a function of consistency, but it was small.

Wear Test Performance

Wear measurements using the 4-ball wear tester were made on the samples prepared in the concentration study. Wear measurements on greases are difficult and, normally, of poor repeatability. There did not appear to be any correlation of the wear scar level with thickening efficiency or oil separation tendency for these greases. All are, however, within a range normally observed for this kind of grease.

TABLE 2

EVALUATION OF EXPERIMENTAL HYDROFLUOROCARBON TELOMER DISPERSIONS vs. "VYDAX" 1000 FLUOROTELOMER DISPERSION AS GREASE THICKENING AGENTS

| SAMPLE | PENETRATION | OIL SEPARATION % LOSS | 4-BALL WEAR SCAR, mm. | COEFFICIENT OF FRICTION |
|---|---|---|---|---|
| EX 1 | 298 | 10.3 | 0.554 | 0.134 |
| EX 2 | 283 | 5.6 | 0.393 | 0.091 |
| EX 3 | 245 | 12.6 | 0.373 | 0.095 |
| CONTROL "VYDAX" 1000 in "FREON" 113 DISPERSION | 245 | 3.2 | 0.586 | 0.103 |

I claim:

1. A process for preparing a fluorotelomer which consists essentially in reacting tetrafluoroethylene or hexafluoropropylene with a hydrofluorocarbon telogen in solution in said hydrofluorocarbon in the presence of a free radical initiator at a temperature in excess of 110° C. and up to 200° C., wherein said hydrofluorocarbon:
   consists essentially of an acyclic organic compound having a boiling point at atmospheric pressure between 25° C. and 150° C. and containing 2 to 8 carbon atoms, fluorine, at least one hydrogen, with or without one or more ether oxygen atoms, in which there are at least as many fluorine atoms as there are hydrogen atoms; provided that said organic compound contains neither any
   (1) alkyl group which is bonded to a perfluorinated group; nor
   (2) adjacent —CH$_2$— groups, except when said adjacent —CH$_2$— groups are part of a cyclic organic compound,
   and recovering a fluorotelomer having a number average molecular weight between 1800 and 75,000.

2. The process of claim 1 wherein said telomer has a number average molecular weight in the range between 3000 and 6000.

3. The process of claim 2 wherein said telomer has a number average molecular weight in the range between 4000 and 5000.

4. The process of claim 1 wherein said telomer has a number average molecular weight in the range between 15,000 and 50,000.

5. The process of claim 4 wherein said telomer has a number average molecular weight in the range between 25,000 and 35,000.

6. The process of claim 1 wherein said hydrofluorocarbon is
   2,3-dihydrodecafluoropentane,
   1,4-dihydrooctafluorobutane,
   2-trifluoromethyl-2,3-dihydrononafluoropentane
   1,1,2,3,3,3-hexafluoropropyl methyl ether, or mixtures thereof.

7. The process of claim 1 wherein, in addition to said hydrofluorocarbon, an additional chain transfer agent is used in an amount up to 4 mol %, based on the total number of moles of monomer.

8. A process for preparing a fluorotelomer which consists essentially in reacting tetrafluoroethylene with a hydrofluorocarbon telogen in solution in said hydrofluorocarbon in the presence of a free radical initiator at a temperature in the range between 120° and 160° C., wherein said hydrofluorocarbon:
   consists essentially of an acyclic organic compound having a boiling point at atmospheric pressure between 25° C. and 150° C. and containing 2 to 8 carbon atoms, fluorine, at least one hydrogen, with or without one or more ether oxygen atoms, in which there are at least as many fluorine atoms as there are hydrogen atoms; provided that said organic compound contains neither any
   (1) alkyl group which is bonded to a perfluorinated group; nor
   (2) adjacent —CH$_2$— groups, except when said adjacent —CH$_2$— groups are part of a cyclic organic compound, and recovering a fluorotelomer having a number average molecular weight between 1800 and 75,000.

9. The process of claim 8 wherein said hydrofluorocarbon is
   2,3-dihydrodecafluoropentane, 1,4-dihydrooctafluorobutane,
2-trifluoromethyl-2,3-dihydrononafluoropentane
1,1,2,3,3,3-hexafluoropropyl methyl ether, or mixtures thereof.

10. The process of claim 8 wherein, in addition to said hydrofluorocarbon, an additional chain transfer agent is used in an amount up to 4 mol %, based on the total number of moles of monomer.

11. A fluorotelomer produced by the process of either claim 1, 2, 3, 4, 5, 6, 7, 8, 9 or 10.

12. A dispersion of the fluorotelomer of claim 11 in a hydrofluorocarbon which consists essentially of an acyclic organic compound having a boiling point at atmospheric pressure between 25° C. and 150° C. and containing 2 to 8 carbon atoms, fluorine, at least one hydrogen, with or without one or more ether oxygen atoms, in which there are at least as many fluorine atom as there are hydrogen atoms; provided that said organic compound contains neither any
(1) alkyl group which is bonded to a perfluorinated group; nor
(2) adjacent —CH$_2$— groups, except when said adjacent —CH$_2$— groups are part of a cyclic organic compound.

* * * * *